(12) United States Patent
Halloy et al.

(10) Patent No.: US 10,473,091 B2
(45) Date of Patent: Nov. 12, 2019

(54) POWER GENERATION USING LIQUIDS WITH DIFFERENT VAPOUR PRESSURES

(71) Applicant: DELTA DRIVEN 24 SPRL, Habay (BE)

(72) Inventors: Guillaume Halloy, Habay-la-Neuve (BE); Elise Halloy, Luxembourg (LU); Louis Halloy, Habay-la-Neuve (BE); Helene Halloy, Habay-la-Neuve (BE)

(73) Assignee: DELTA DRIVEN 24 SPRL, Habay (BE)

( * ) Notice: Subject to any disclaimer, the term of this patent is extended or adjusted under 35 U.S.C. 154(b) by 12 days.

(21) Appl. No.: 16/064,925

(22) PCT Filed: Dec. 23, 2016

(86) PCT No.: PCT/EP2016/082524
§ 371 (c)(1),
(2) Date: Jun. 21, 2018

(87) PCT Pub. No.: WO2017/109159
PCT Pub. Date: Jun. 29, 2017

(65) Prior Publication Data
US 2019/0024643 A1    Jan. 24, 2019

(30) Foreign Application Priority Data

Dec. 24, 2015 (GB) .................................. 1522888.5

(51) Int. Cl.
*F03G 7/04* (2006.01)
*F03B 17/00* (2006.01)

(52) U.S. Cl.
CPC ................ *F03G 7/04* (2013.01); *F03B 17/00* (2013.01)

(58) Field of Classification Search
CPC .. F03G 7/04; F03B 17/00; F03B 17/02; F01K 27/00; F01K 27/005
See application file for complete search history.

(56) References Cited

U.S. PATENT DOCUMENTS 3,906,250 A * 9/1975 Loeb .................... B01D 61/002
290/1 R
4,027,483 A * 6/1977 Wahl, III .................. F01D 1/32
60/641.2

(Continued)

FOREIGN PATENT DOCUMENTS

CN         1738668 A     2/2006
CN       102022294 A     4/2011
(Continued)

OTHER PUBLICATIONS

PCT; App. No. PCT/EP2016/082524; International Search Report and Written Opinion dated May 30, 2017.
(Continued)

*Primary Examiner* — Mark A Laurenzi
*Assistant Examiner* — Xiaoting Hu
(74) *Attorney, Agent, or Firm* — Fitch, Even, Tabin & Flannery LLP

(57) ABSTRACT

The present disclosure relates to apparatus and methods of generating power that utilise the flow of vapour between two or more liquid bodies having different vapour pressures. Power is generated as a result of the flow of vapour from a liquid body having a higher vapour pressure to a liquid body having a lower vapour pressure.

13 Claims, 5 Drawing Sheets

(56) References Cited

U.S. PATENT DOCUMENTS

| | | | |
|---|---|---|---|
| 4,232,524 A | 11/1980 | Goyat | |
| 4,307,573 A * | 12/1981 | King | F03G 7/04 165/125 |
| 7,898,102 B2 * | 3/2011 | Alstot | F03B 13/00 290/54 |
| 2002/0130520 A1 * | 9/2002 | Finley | F03B 13/00 290/54 |
| 2004/0099521 A1 | 5/2004 | Demers | |
| 2011/0044824 A1 | 2/2011 | Kelada | |
| 2013/0036735 A1 * | 2/2013 | Sankrithi | F03G 7/04 60/641.6 |
| 2013/0160446 A1 | 6/2013 | Paya Diaz | |
| 2013/0333382 A1 | 12/2013 | Li | |

FOREIGN PATENT DOCUMENTS

| | | |
|---|---|---|
| CN | 202811178 U | 3/2013 |
| FR | 2 384 965 A1 | 10/1978 |
| FR | 2 779 487 A1 | 12/1999 |
| KR | 20090072897 A | 7/2009 |
| KR | 101 171 262 B1 | 8/2012 |
| PT | 101694 A | 12/1996 |
| RS | 20 120 178 A1 | 10/2013 |
| WO | 2013/175302 A2 | 11/2013 |

OTHER PUBLICATIONS

UKIPO; App. No. GB1522888.5; Search Report Under Section 17(6) dated Jun. 21, 2016.
UKIPO; App. No. GB1522888.5; Patent Search Report Under Section 17(5) dated Mar. 22, 2016.
Olson, Mark S.; "Salinity-Gradient Vapor-Pressure Power Conversion"; Energy vol. 7, No. 3, published 1982; pp. 237-246.
Olson, Mark S.; "Salinity Gradient Power: Utilizing Vapor Pressure Differences"; Science, vol. 206, published Oct. 26, 1979; pp. 452-454.
PRVInterPat; Novelty Search Report dated Mar. 27, 2015.

* cited by examiner

POWER GENERATION USING LIQUIDS WITH DIFFERENT VAPOUR PRESSURES

CROSS-REFERENCE TO RELATED APPLICATIONS

This application is a U.S. national phase application filed under 35 U.S.C. § 371 of International Application No. PCT/EP2016/082524, filed Dec. 23, 2016, designating the United States and claiming priority to British Patent Application No. 1522888.5, filed Dec. 24, 2015.

FIELD

The present disclosure relates to apparatus and methods of generating power that utilise the flow of vapour between two or more liquid bodies having different vapour pressures. Power is generated as a result of the flow of vapour from a liquid body having a higher vapour pressure to a liquid body having a lower vapour pressure.

BACKGROUND

Energy is released when two liquids of different salinities mix together. For example, the osmotic pressure difference between fresh water and sea water is approximately 29 atm at 20° C. For a flow rate of 1 $m^3$/s this represents a theoretical power of almost 3 MW. This release of energy may therefore be used to generate power, for example at the mouth of a river as it enters the sea.

Most methods of extracting this energy rely on osmosis of water across semi-permeable membranes. One such method is pressure-retarded osmosis (PRO). In PRO a saline solution is contained within a pressure chamber and separated from fresh water by a semi-permeable membrane. The semi-permeable membrane is permeable to water but impermeable to the dissolved salt ions ($Na^+$ and $Cl^-$). The passage of water across the semi-permeable membrane from the fresh water side to the saline side causes the pressure in the chamber to increase. This pressure increase is then used to generate power, for example by releasing the pressure through a turbine to generate electricity.

Another method of generating power from salinity gradients is reverse electrodialysis. In reverse electrodialysis a saline solution and fresh water are passed through ion-exchange membranes. The chemical potential difference between the saline solution and fresh water generates a voltage across the membranes, thus providing power.

Both of these methods rely on the use of semi-permeable membranes and suffer from numerous drawbacks as a result. The disadvantages of using semi-permeable membranes include their high cost, their vulnerability to fouling, degradation, polarisation, the substantial head loss that occurs when a liquid passes through a membrane, and the requirement to filter and pre-treat the solutions.

An alternative method for generating power from salinity gradients is to use the free surface of the liquids themselves as the membrane. Since a saline solution has a lower vapour pressure than that of fresh water, water vapour will be transferred from fresh water to a saline solution in a sealed chamber. In *Salinity Gradient Power: Utilizing Vapor Pressure Differences*, Science, 206, 452-454 (1979) and *Salinity-Gradient Vapor-Pressure Power Conversion*, Energy, 7(3), 237-246 (1982) arrangements are described in which a turbine is interposed in the vapour flow between fresh water and a saline solution in an evacuated chamber, and it is suggested that the flow of vapour through the turbine could be used to generate power. In these arrangements the evaporation and condensation of the vapour causes a transfer of heat from the fresh water to the saline solution. It is therefore necessary to transfer heat back from the saline solution to the fresh water solution, otherwise the rate of vaporisation will reduce and eventually stop.

Although the vapour pressure methods outlined above overcome some of the disadvantages of using semi-permeable membranes, other drawbacks are associated with using such an approach. One disadvantage of these arrangements is that it is necessary for the atmosphere to be evacuated initially from the chamber to provide a vacuum in order that the flow of vapour may drive a turbine placed in the vapour flow. This requires an additional input of energy into the system and also requires that the liquid bodies are degassed to avoid outgassing into the evacuated chamber.

Another disadvantage of this prior art arrangement is that the pressure drop across the turbine is likely to be very small, approximately 0.4 mmHg, when vapour is transferred between fresh water and sea water at 20° C. This makes power extraction using a gas turbine impractical. The absolute pressure of the vapour is also low, approximately 18 mmHg at 20° C., which means that the force acting on the turbine is low, thereby hindering the amount of power that can be generated by the turbine.

It is an object of the present disclosure to provide improved apparatus and methods for generating power that utilise the flow of vapour between two or more liquid bodies having different vapour pressures.

SUMMARY

According to a first aspect of the present disclosure, there is provided a method of generating power comprising:
  transferring liquid via the vapour phase from a source liquid body to a sink liquid body, and
  generating power by releasing liquid from the sink liquid body,
  wherein the vapour pressure of the source liquid body is higher than the vapour pressure of the sink liquid body, and
  wherein the source liquid body and the sink liquid body are not in physical contact.

In this way, power is generated as a result of the flow of vapour from a liquid body having a higher vapour pressure to a liquid body having a lower vapour pressure but without the need for semi-permeable membranes.

The transfer of liquid via the vapour phase from the source liquid body to the sink liquid body may cause a hydrostatic pressure to build up in the sink liquid body. The maximum possible hydrostatic head that could be achieved using this method is about 300 m. However, the apparatus may be operated in such a way that a hydrostatic head of less than this height is achieved, for example 100 m or less.

The step of generating power may comprise passing the liquid released from the sink liquid body through a first mechanism for generating power. Typically, a build-up of hydrostatic pressure in the sink liquid body can be used to force liquid out through the first mechanism for generating power. Typically, the first mechanism for generating power is a turbine, preferably a water turbine.

Alternative mechanisms for generating power are also contemplated, for example those employing pistons, screws or paddles.

Alternatively, the release of liquid from the sink liquid body may cause the sink liquid body to rotate about an axis of rotation, wherein the axis of rotation is not coincident with any part of the sink liquid body, and wherein power is generated by the rotation of the sink liquid body. In this way, the axis of rotation is spaced apart from the sink liquid body.

Preferably, in methods wherein the sink liquid body rotates about an axis of rotation, power is generated using an electrical alternator or generator.

In methods wherein the sink liquid body rotates about an axis of rotation, the axis of rotation may be coincident with at least part of the source liquid body. Alternatively, the axis of rotation may be spaced apart from the source liquid body such that it is not coincident with any part of the source liquid body, and the release of liquid from the sink liquid body may cause the source liquid body to rotate about the axis of rotation. In methods wherein the axis of rotation is not coincident with any part of the source liquid body, the closest distance between the source liquid body and the axis of rotation is preferably greater than the closest distance between the sink liquid body and the axis of rotation. The method of the first aspect may comprise a further step of generating power by passing vapour from the source liquid body through a second mechanism for generating power during the step of transferring liquid via the vapour phase from the source liquid body to the sink liquid body. The second mechanism for generating power may be a turbine, preferably a gas turbine. Alternative mechanisms for generating power are also contemplated, for example those employing pistons, screws or paddles.

Preferably a heat pump is used to transfer heat from the sink liquid body to the source liquid body. Evaporation from the source liquid body and condensation of the vapour in the sink liquid body may cause a transfer of heat from the source liquid body to the sink liquid body. This transfer of heat may cause the difference between the vapour pressures of the source liquid body and the sink liquid body to reduce. A reduction in the vapour pressure gradient between the source liquid body and the sink liquid body will have the effect of reducing the rate of vapour transfer, and may eventually halt vapour transfer completely. It is therefore desirable to transfer heat back from the sink liquid body to the source liquid body. This may be achieved by using a heat pump. Alternatively or additionally, heat may be transferred from the sink liquid body to the source liquid body using a heat exchanger.

The difference between the vapour pressure of the source liquid body and the vapour pressure of the sink liquid body may be caused or increased by increasing the temperature of the source liquid body, by lowering the temperature of the sink liquid body, or, preferably, by a combination of the two. This may be achieved through the use of a heat pump, which transfers heat from the sink liquid body to the source liquid body, such that $T_1 > T_2$, where $T_1$ is the temperature of the source liquid body and $T_2$ is the temperature of the sink liquid body. The use of a heat pump is advantageous in this situation as the difference between $T_1$ and $T_2$ is not large and the transfer of heat will therefore be efficient. Alternatively or additionally, the source liquid body may be heated by other means, for example using solar energy, electrical energy, or combustion.

According to a second aspect of the present disclosure, there is provided a method of generating power comprising:
    transferring liquid via the vapour phase from a source liquid body to a sink liquid body, and
    generating power by passing vapour from the source liquid body through a mechanism for generating power as it is transferred from the source liquid body to the sink liquid body,
    wherein a heat pump is used to transfer heat from the sink liquid body to the source liquid body,
    wherein the vapour pressure of the source liquid body is higher than the vapour pressure of the sink liquid body, and
    wherein the source liquid body and the sink liquid body are not in physical contact.

In the method of the second aspect, the mechanism for generating power may be a turbine, preferably a gas turbine. Alternative mechanisms for generating power are also contemplated, for example those employing pistons, screws or paddles.

The difference between the vapour pressure of the source liquid body and the vapour pressure of the sink liquid body is increased by increasing the temperature of the source liquid body, by lowering the temperature of the sink liquid body, or, preferably, by a combination of the two. This is achieved through the use of the heat pump, which transfers heat from the sink liquid body to the source liquid body, such that $T_1 > T_2$, where $T_1$ is the temperature of the source liquid body and $T_2$ is the temperature of the sink liquid body. The use of a heat pump is particularly advantageous in situations where the difference between $T_1$ and $T_2$ is not large and the transfer of heat will therefore be efficient. Alternatively, a large temperature difference between $T_1$ and $T_2$ may be caused by the transfer of heat from the sink liquid body to the source liquid body by the heat pump, such that $T_1 \gg T_2$. $T_1$ may be increased by any amount up to the boiling point of the source liquid. For example, $T_1$ may be 10° C., 20° C., 30° C., 40° C., 50° C., 60° C. or more higher than $T_2$. This has the advantage of causing a more substantial difference between the vapour pressure of the source chamber and the vapour pressure of the sink chamber, which may make the generation of power using gas turbines and other means more practicable. The source liquid body may additionally be heated by other means, for example using solar energy, electrical energy, or combustion.

In any of the methods disclosed herein, there may be more than one source liquid body. Alternatively, or in addition, there may be more than one sink liquid body.

In all the methods disclosed herein, the vapour pressure of the source liquid body is higher than the vapour pressure of the sink liquid body. This has the effect of providing a vapour pressure gradient between the source liquid body and the sink liquid body, wherein the vapour pressure above the source liquid body is higher than the vapour pressure above the sink liquid body. This vapour pressure gradient causes a transfer of vapour (also described as a "flow of vapour") from the source liquid body to the sink liquid body, where it condenses. A greater difference between the vapour pressures of the source liquid body and the sink liquid body will result in a faster rate of transfer of liquid from the source liquid body to the sink liquid body.

In any of the methods described herein, the source liquid body and the sink liquid body may be aqueous solutions. Preferably, the source liquid body has a different salinity to the sink liquid body. More preferably, the source liquid body has a lower salinity than the sink liquid body. The source liquid body may be obtained from a fresh water body and the sink liquid body may be obtained from a saline body. For example, the fresh water body may be a river or a fresh water lake and the saline body may be a sea, an ocean or a lake having a higher salinity than a fresh water lake.

In any of the methods described herein, there may comprise a further step of increasing the salinity of the sink liquid body by adding a salt. The step of adding a salt to the sink liquid body has an advantage of increasing the difference between the vapour pressures of the source liquid body and the sink liquid body. Preferably, the salt is sodium chloride.

In any of the methods described herein, the source liquid body and the sink liquid body may be in thermal contact.

In any of the methods described herein, the source liquid body, the sink liquid body, and the vapour phase may be contained essentially within at least one chamber. The at least one chamber may be sealable so that it may be isolated from the surrounding atmosphere. The pressure that exists within the chamber may be controlled.

In arrangements where the chamber is sealable, the method may further comprise the step of evacuating the atmosphere from within the at least one chamber prior to the generation of power. Preferably, when the chamber is evacuated, the method further comprises the step of degassing at least one of the source liquid body and the sink liquid body. Degassing of the source liquid body and the sink liquid body may be performed either before or after the liquids have entered the chamber.

Preferably, the atmosphere within the chamber is evacuated to leave substantially only vapour from the source liquid body and/or the sink liquid body in the gas phase within the apparatus or chamber. This has an advantage of increasing the speed of vapour flow from the source liquid body to the sink liquid body, but requires an additional input of energy in order to evacuate the chamber. Preferably, when the method is carried out in a sealable chamber, in which the chamber can be isolated from the surrounding atmosphere, the method comprises a single step of evacuating the atmosphere from the chamber because the airtight nature of the chamber is able to prevent the return of atmospheric gas. Where the chamber is not completely airtight or where degassing from the liquids occurs, multiple steps of evacuating the atmosphere from the chamber may be required.

In any of the methods described herein, the sink liquid body may have a volume that is substantially greater than the volume of the source liquid body. Preferably, the sink liquid body has a large enough volume such that the transfer of liquid from the source liquid body to the sink liquid body via the vapour phase does not reduce appreciably the difference between the vapour pressures of the source liquid body and the sink liquid body to a level where the rate of vapour transfer is substantially reduced. For example, in aspects wherein the sink liquid body is a saline solution and the source liquid body is a saline solution having a lower salinity than that of the sink liquid body, such as fresh water, the transfer of liquid from the source liquid body to the sink liquid body via the vapour phase will progressively reduce the salinity of the sink liquid body. Such a reduction in the salinity of the sink liquid body will reduce the difference between the vapour pressures of the source liquid body and the sink liquid body to a level where the rate of vapour transfer is reduced, and potentially eventually halted.

In any of the methods described herein, the step of generating power by releasing liquid from the sink liquid body may occur once during the method. Alternatively, the step of generating power by releasing liquid from the sink liquid body may be repeated multiple times. Preferably, the step of generating power by releasing liquid from the sink liquid body occurs cyclically. Alternatively, the step of generating power by releasing liquid from the sink liquid body occurs essentially continuously during the method.

According to a third aspect of the present disclosure, there is provided an apparatus for generating power comprising a source chamber and a sink chamber, wherein:

the source chamber and the sink chamber are connected by a vapour flow opening;
the source chamber comprises an opening for connecting to a first liquid source;
the sink chamber comprises an opening for connecting to a second liquid source;
the sink chamber opening is sealable;
the source chamber and the sink chamber are configured so that a liquid contained within
the source chamber and a liquid contained within the sink chamber are physically separated; and
the apparatus comprises a first mechanism for generating power from a flow of liquid through
the sink chamber opening.

The apparatus comprises a mechanism for sealing the sink chamber opening. Preferably, the mechanism for sealing the sink chamber opening comprises or consists of a valve. The valve may comprise a cylinder or a piston.

The first mechanism for generating power may be a turbine, preferably a water turbine. Alternative mechanisms for generating power are also contemplated, for example those employing pistons, screws or paddles.

The apparatus may further comprise a second mechanism for generating power from a flow of vapour through the vapour flow opening. The second mechanism for generating power may be a turbine, preferably a gas turbine. Alternative mechanisms for generating power are also contemplated, for example those employing pistons, screws or paddles.

The apparatus may comprise a heat pump configured to transfer heat from the sink chamber to the source chamber. As described above in relation to the methods of the present disclosure, an advantage of a heat pump is that it may enable the difference between the vapour pressure of the liquid in the source chamber and the vapour pressure of the liquid in the sink chamber to be increased by increasing the temperature of the liquid in the source chamber and/or by lowering the temperature of the liquid in the sink, as described above in relation to the methods of the present disclosure. Alternatively, heat may be transferred from the sink liquid body to the source liquid body using a heat exchanger.

The apparatus may further comprise a pressure release valve configured so that pressurised gas may be released from the interior of the apparatus. The pressure release valve may additionally comprise a mechanism for generating power from the flow of vapour through the pressure release valve.

According to a fourth aspect of the present disclosure, there is provided an apparatus for generating power comprising a source chamber and a sink chamber,
wherein:
the source chamber and the sink chamber are connected by a vapour flow opening;
the apparatus comprises a mechanism for generating power from the flow of vapour through the vapour flow opening;
the source chamber comprises an opening for connecting to a first liquid source;
the sink chamber comprises an opening for connecting to a second liquid source;
the source chamber and the sink chamber are configured so that a liquid contained within the source chamber and a liquid contained within the sink chamber are physically separated; and
the apparatus comprises a heat pump, which is configured to transfer heat from the sink chamber to the source chamber.

The mechanism for generating power may be a turbine, preferably a gas turbine. Alternative mechanisms for generating power are also contemplated, for example those employing pistons, screws or paddles.

In any of the apparatus of the third or fourth aspect of the disclosure, the sink chamber may have a volume that is substantially greater than the volume of the source chamber. Preferably, the sink chamber has a large enough volume such that transfer of liquid from the source chamber to the sink chamber via the vapour phase does not reduce the difference between the vapour pressures of the source liquid body and the sink liquid body to a level where the rate of vapour transfer is substantially reduced. For example, in aspects wherein the sink liquid body comprises a saline solution and the source liquid body comprises a saline solution having a lower salinity than that of the sink liquid body, such as fresh water, the transfer of liquid from the source chamber to the sink chamber via the vapour phase will progressively reduce the salinity of the liquid in the sink chamber. Such a reduction in the salinity of the liquid in the sink chamber will reduce the difference between the vapour pressures of the liquid in the source chamber and the liquid in the sink chamber to a level where the rate of vapour transfer is reduced, and eventually halted.

In any of the apparatus of the third or fourth aspect of the disclosure, the source chamber may be sealable so that it may be isolated from the surrounding atmosphere.

In any of the apparatus of the third or fourth aspect of the disclosure, the source chamber and the sink chamber may be configured so that a liquid body contained within the source chamber and a liquid body contained within the sink chamber are in thermal contact.

According to a fifth aspect of the present disclosure, there is provided an apparatus for generating power comprising a chamber,
  wherein:
    the chamber comprises a source liquid portion and a sink liquid portion;
    the sink liquid portion is rotatable about an axis of rotation;
    the axis of rotation is not coincident with any part of the sink liquid portion;
    the sink liquid portion comprises an outlet;
    the sink liquid portion outlet is positioned such that the release of liquid through the sink liquid portion outlet causes the sink liquid portion to rotate about the axis of rotation;
    the source liquid portion comprises an inlet for connecting to a first liquid source;
    the sink liquid portion comprises an inlet for connecting to a second liquid source; and
the apparatus comprises a first mechanism for generating power from the rotation of the sink liquid portion about the axis of rotation.

The first mechanism for generating power may be an electrical alternator or generator.

The source liquid portion may be rotatable about the axis or rotation.

Typically, the chamber comprising the source liquid portion and the sink liquid portion is rotatable about the axis of rotation.

The source liquid portion and the sink liquid portion may be configured to contain liquid when the chamber rotates about the axis of rotation.

The sink liquid portion may be configured to contain liquid when the chamber is not rotating about the axis of rotation.

The source liquid portion may be configured to contain liquid when the chamber is not rotating about the axis of rotation.

The chamber may comprise a first arm, wherein the first arm comprises a distal end, wherein the distal end is the end of the first arm that is furthest from the axis of rotation, and wherein the sink liquid portion is located at the distal end of the first arm.

The axis of rotation may be spaced apart from the source liquid portion such that it is not coincident with any part of the source liquid portion. In apparatus wherein the axis of rotation is not coincident with any part of the source liquid portion, the chamber may comprise a second arm, wherein the second arm comprises a distal end, wherein the distal end is the end of the second arm that is furthest from the axis of rotation, and wherein the source liquid portion is located at the distal end of the second arm. Additionally or alternatively, in apparatus wherein the axis of rotation is not coincident with any part of the source liquid portion, the closest distance between the source liquid portion and the axis of rotation is preferably greater than the closest distance between the sink liquid portion and the axis of rotation.

In arrangements where the chamber has a first arm comprising the sink liquid portion and a second arm comprising the source liquid portion, the arms may be configured such that the first arm is not parallel to the second arm. For example, the first arm or the second arm or both the first arm and the second arm may be configured such that when the chamber is not rotating, the distal end of the arm is located below the portion of the arm nearest the axis of rotation. The first and second arms may be arranged such that the first arm and the second arm are substantially parallel when the chamber rotates.

Alternatively, the axis of rotation may be coincident with at least part of the source liquid portion.

Preferably, the apparatus further comprises a second mechanism for generating power from a flow of vapour between the source liquid portion and the sink liquid portion. The second mechanism for generating power may be a turbine, preferably a gas turbine. Alternative mechanisms for generating power are also contemplated, for example those employing pistons, screws or paddles.

The apparatus may comprise a heat pump configured to transfer heat from the sink liquid portion to the source liquid portion.

The apparatus may comprise a heat exchanger configured to transfer heat between the sink liquid portion and the source liquid portion.

The source liquid portion and the sink liquid portion may be configured so that a liquid contained within the source liquid portion and a liquid contained within the sink liquid portion are physically separated. Typically, separation of the liquid in the source liquid portion from the liquid in the sink liquid portion is achieved by rotation of the sink chamber about the axis of rotation. However, the primary function of the rotation of the chamber is to provide an increase in pressure in the sink liquid body, and other means of confining the liquid bodies contained within the source liquid portion and the sink liquid portion are contemplated that do not rely on the rotation of the chamber but rely instead on the configuration of the apparatus.

The source liquid portion and the sink liquid portion may be configured so that a liquid body contained within the source liquid portion and a liquid body contained within the sink liquid portion are in thermal contact.

In any of the apparatus described herein, the chamber may be sealable so that it may be isolated from the surrounding atmosphere. The apparatus may comprise a mechanism for evacuating the interior atmosphere of the apparatus.

The sink liquid portion may have a volume that is substantially greater than the volume of the source liquid portion. Preferably, the sink liquid portion has a large enough volume such that transfer of liquid from the source liquid portion to the sink liquid portion via the vapour phase does not reduce the difference between the vapour pressures of the source liquid body and the sink liquid body to a level where the rate of vapour transfer is substantially reduced. For example, in aspects wherein the sink liquid body comprises a saline solution and the source liquid body comprises a saline solution having a lower salinity than that of the sink liquid body, such as fresh water, the transfer of liquid from the source liquid portion to the sink liquid portion via the vapour phase will progressively reduce the salinity of the liquid in the sink liquid portion. Such a reduction in the salinity of the liquid in the sink liquid portion will reduce the difference between the vapour pressures of the liquid in the source liquid portion and the liquid in the sink liquid portion to a level where the rate of vapour transfer is reduced, and eventually halted.

In any of the apparatus described herein, the first liquid source and the second liquid source may be aqueous solutions. The first liquid source may have a different salinity to the second liquid source. Typically, the first liquid source has a lower salinity than the second liquid source. The first liquid source may be obtained from a fresh water body and the second liquid source may be obtained from a saline body. For example, the fresh water body may be a river or a fresh water lake and the saline body may be a sea, an ocean or a lake having a higher salinity than a fresh water lake.

The following features apply to each of the methods and apparatus described herein.

The source liquid and/or the sink liquid may be treated prior to entering the apparatus. Such treatment may include filtering suspended solids and/or larger organisms from the liquid.

The source liquid and/or the sink liquid may be heated to an elevated temperature (above ambient temperature). Heating of the source liquid is preferable in order to increase the vapour pressure differences between the source liquid and the sink liquid and thereby enhance the rate of vapour transfer.

In the aspects of the disclosure where the first liquid source is a fresh water source, such as a river, and the second liquid source is a saline solution, such as an ocean or a sea, it may be advantageous to construct a pipe or canal to carry the fresh water out to sea. Alternatively or in addition, it may be advantageous to bring undiluted sea water to the mouth of the river and to generate power at the terminus of the pipe or canal, thereby maximising the difference in salinity between the fresh water and the saline solution. It may also be advantageous to source the saline sink liquid at depth. Sourcing the saline sink liquid at depth would have the advantage that deep water is less likely to be diluted with fresh water and that deep water is usually cooler than surface water, thereby enhancing the vapour pressure differences between the sink liquid and the source liquid.

Since each of the methods and apparatus disclosed herein relies on the evaporation and condensation of vapour, it is preferred to increase the surface areas of the liquids so as to increase the rates of these processes. It is also preferred to increase the internal surface area of the sink chamber so that there is a greater surface area upon which the vapour may condense.

In aspects of the disclosure where the atmosphere within the apparatus is not evacuated, it is advantageous for the apparatus to be completely airtight during operation, but this is not a necessary condition. While it may be advantageous for the apparatus to be entirely airtight, a vapour pressure gradient between the source liquid and the sink liquid within the apparatus may still be maintained even in the case of a limited exchange of gas between the interior atmosphere of the apparatus and the external atmosphere.

Features described herein in conjunction with a particular aspect or example of the disclosure are to be understood to be applicable to any other aspect, embodiment or example described herein unless incompatible therewith. As used herein, the singular is understood to include a plurality, unless the context requires otherwise.

The term "comprising" encompasses "including" as well as "consisting" and "consisting essentially of" e.g. a composition "comprising" X may consist exclusively of X or may include something additional e.g. X+Y.

The term "aqueous solution" as used herein, in relation to any of the methods or apparatus described, includes fresh water.

The term "positive pressure" as used herein, in relation to any of the methods or apparatus described, means a pressure within a system that is greater than the environment that surrounds that system.

The term "phase" as used herein, in relation to any of the methods or apparatus described, means a physically separate, homogeneous part of a heterogeneous system.

The term "source liquid" as used herein, in relation to any of the methods or apparatus described, includes a liquid that is contained within the first liquid source or that is contained within the source liquid chamber/portion/reservoir/body.

The term "sink liquid" as used herein, in relation to any of the methods or apparatus described, includes a liquid that is contained within the second liquid source or that is contained within the sink liquid chamber/portion/reservoir/body.

The term "source liquid body" as used herein, in relation to any of the methods or apparatus described, does not include any liquid contained within of flowing through inlets, outlets, or other openings used to supply or release liquid from the source liquid body.

The term "sink liquid body" as used herein, in relation to any of the methods or apparatus described, does not include any liquid contained within of flowing through inlets, outlets, or other openings used to supply or release liquid from the sink liquid body.

The term "closest distance" as used herein, in relation to any of the methods or apparatus described, means the distance between the parts closest in space of two bodies or elements.

BRIEF DESCRIPTION OF THE DRAWINGS

The disclosure is further illustrated by reference to the following drawings, wherein.

DESCRIPTION OF THE PREFERRED EMBODIMENTS

Figure 1:
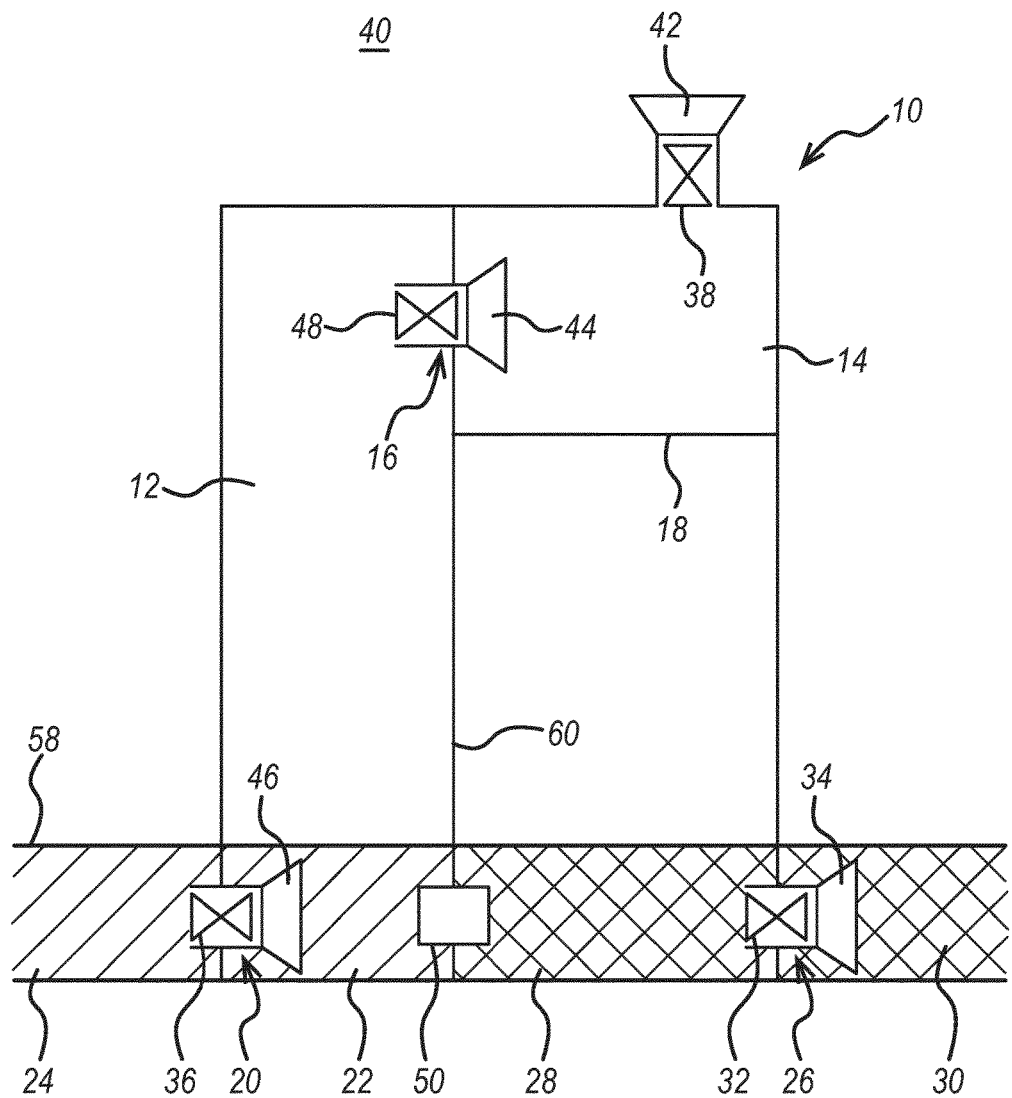
FIG. 1 shows a schematic cross-sectional side view of a first apparatus according to the present disclosure.

With reference to FIG. 1, there is illustrated an apparatus according to the present disclosure. The apparatus may be used in a method of the present disclosure, and may be described as a "gravitational method". The apparatus 10 comprises a source chamber 12 and a sink chamber 14. The source chamber 12 and the sink chamber 14 are connected by a vapour flow opening 16. The vapour flow opening 16 is located above the maximum level reached by liquid within the apparatus during operation, shown by line 18, such that liquid does not pass through the vapour flow opening during use of the apparatus.

The source chamber 12 incorporates an opening 20, through which a first liquid 22 (also described herein as the "source liquid"), may pass to or from a first liquid source 24.

The sink chamber 14 incorporates an opening 26, through which a second liquid 28 (also described herein as the "sink liquid"), may pass to or from a second liquid source 30.

The sink chamber opening 26 incorporates a valve 32, enabling the opening 26 to be closed or sealed.

The sink chamber opening 26 also incorporates a first mechanism for generating power 34, such as a turbine, that may be used to generate power.

Source liquid 22 is separated from sink liquid 28, for example, by wall 60.

Power may be generated as follows:
1) The source liquid 22 is introduced into the source chamber 12 from the first liquid source 24 through the source chamber opening 20, and the sink liquid 28 is introduced into the sink chamber 14 from the second liquid source 30 through the sink chamber opening 26.
2) The sink chamber opening valve 32 is closed.
3) Liquid is transferred via the vapour phase from the source liquid 22 in the source chamber 12 to the sink liquid 28 in the sink chamber 14 due to the difference between the vapour pressures of the source liquid 22 and the sink liquid 28.
4) The transfer of liquid via the vapour phase in step 3 causes the level of the sink liquid 28 in the sink chamber 14 to rise, resulting in the build-up of a hydrostatic head in the sink liquid 28 in the sink chamber 14.
5) The sink chamber opening valve 32 is opened.
6) The sink liquid 28 flows under a hydrostatic pressure through the sink chamber opening 26 and the turbine 34, thereby generating power.
7) The process may be repeated from, and including, step 2 in a cyclical manner.

The source chamber opening 20 may optionally incorporate a valve 36 such that the opening may be closed. Optionally, if present, the source chamber opening valve 36 may be closed during step 2 of the above listed sequence.

In the case that the source chamber opening valve 36 is not closed during step 2, it is preferable that the source chamber opening 20 is located entirely below the level (marked by line 58) of the first liquid source 24, such that gas may not pass into the apparatus 10 during operation.

The apparatus 10 may also incorporate a pressure release valve 38. The pressure release valve 38 may be used to release pressure from within the apparatus 10 by allowing gas to escape from within the apparatus 10 to the surrounding environment 40. An increase in pressure within the apparatus 10 may be caused by the transfer of liquid via the vapour phase from the source chamber 12 to the sink chamber 14 when the source chamber opening valve 20 remains open during use and when the atmosphere within the apparatus is not evacuated. The resulting increase in the level of the sink liquid 28 reduces the volume available to the gas phase within the apparatus 10, which causes the pressure within the apparatus 10 to increase. The pressure release valve 38 may incorporate a turbine 42 so that power may be generated as gas escapes under a positive pressure from within the apparatus 10.

Optionally, the vapour flow opening 16 may incorporate a second mechanism for generating power 44, such as a turbine, such that the flow of vapour through the turbine 44 may be used to generate power.

Optionally, the source chamber opening 20 may incorporate a turbine 46, such that the flow of liquid through the turbine may be used generate power.

The apparatus 10 may optionally incorporate a heat pump 50 configured to transfer heat from the sink chamber 14 to the source chamber 12.

After the release of the sink liquid 28 through the sink chamber opening 26 in step 6 it may be advantageous to exchange the liquid remaining in the sink chamber with fresh liquid from the second liquid source 30. This allows source liquid 22 that has transferred via the vapour phase to the sink liquid 28 during step 3 to be removed prior to the next operational cycle and does not adversely affect the vapour pressure gradient between the source chamber 12 and the sink chamber 14.

Optionally, the vapour flow opening 16 may incorporate a valve 48 such that the vapour flow opening 16 may be closed, which may be useful for example for maintenance of the apparatus.

Figure 2:
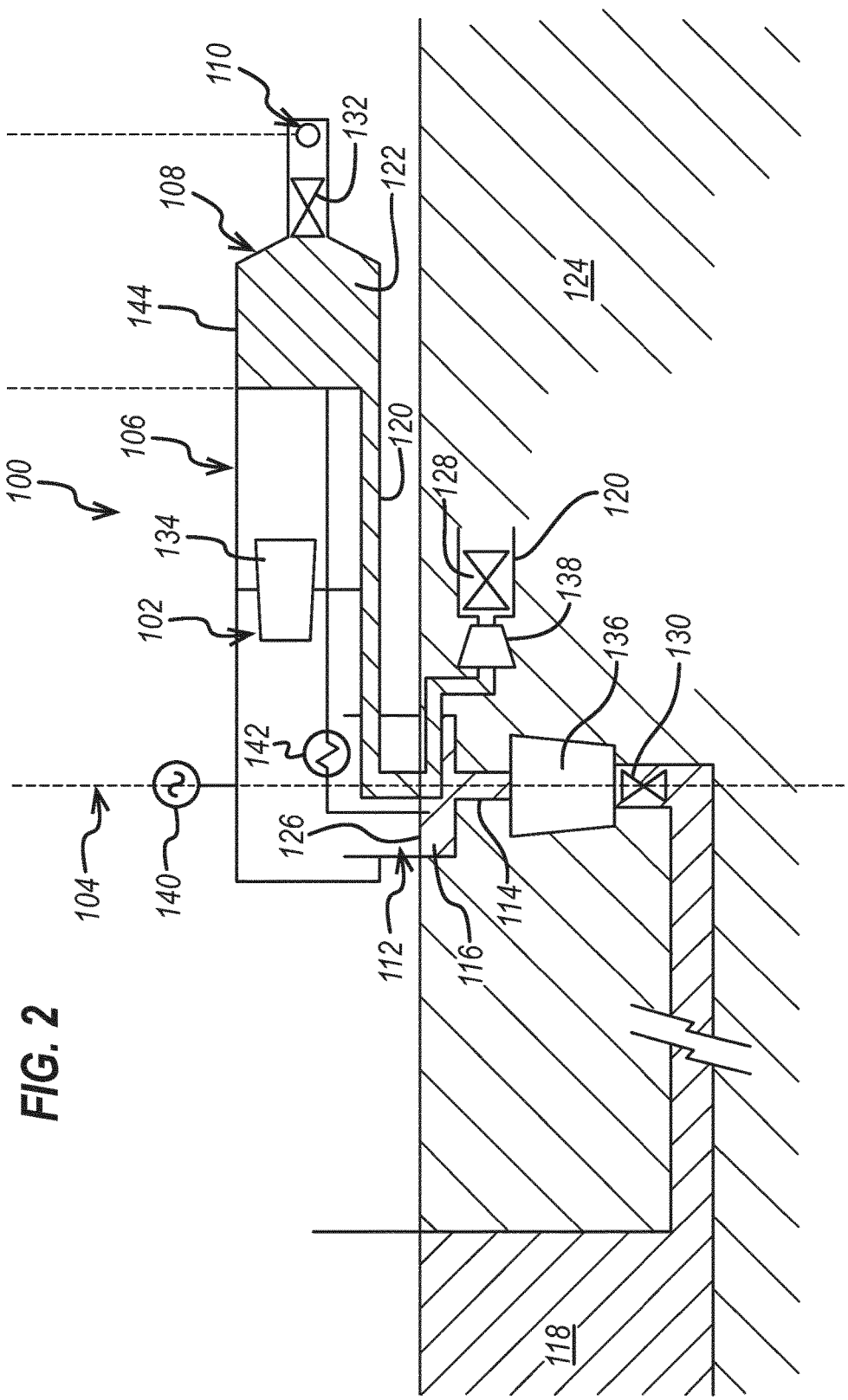
FIG. 2 shows a schematic cross-sectional side view of a second apparatus according to the present disclosure.
Figure 3:
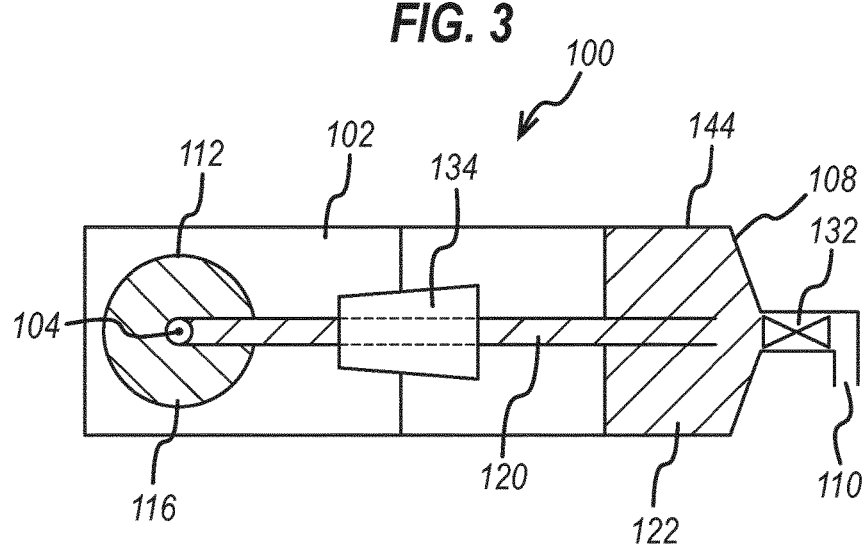
FIG. 3 shows a schematic view looking down onto the second apparatus of FIG. 2.

With reference to FIGS. 2 and 3, there is illustrated a second apparatus according to the present disclosure. The apparatus may be used in a method of the present disclosure that may be described as the "first rotational method". The first rotational method may be performed using an apparatus 100 comprising a chamber 102.

The chamber 102 incorporates an arm 106 extending outwards from an axis of rotation 104.

The end of the chamber arm furthest from the axis of rotation 104 is referred to as the distal end 108.

The chamber arm is configured such that it may rotate about the axis of rotation.

The arm 106 incorporates a sink liquid portion 144 located towards the distal end 108 of the arm 106.

The sink liquid portion 144 incorporates an outlet 110.

The sink liquid portion outlet 110 is located and directed such that the release of liquid through the sink liquid portion outlet 110 provides a force that causes the rotational motion of the chamber 102 about the axis of rotation 104.

The chamber further comprises a source liquid portion 112.

The source liquid portion 112 may be configured such that it may rotate about the axis of rotation. Alternatively, the source liquid portion may be fixed such that it cannot rotate about the axis of rotation.

The source liquid portion 112 incorporates an inlet 114, hereafter referred to as the source liquid portion inlet 114, through which a first liquid 116, also referred to as the source liquid, may pass to or from a first liquid source 118.

The sink liquid portion 144 incorporates an inlet 120, hereafter referred to as the sink liquid portion inlet 120, through which a second liquid 122, also referred to as the sink liquid, may pass to or from a second liquid source 124.

Power is generated as follows:
1) The source liquid 116 is introduced into the source liquid portion 112 through the source liquid portion inlet 114 from the first liquid source 118. The source liquid 116 is confined within the source liquid portion 112 and a surface 126 of the source liquid 126 is exposed to the interior of the chamber 102, such that the source liquid 116 may evaporate into the interior atmosphere of the chamber 102.
2) The chamber 102 is rotated about the axis of rotation 104.
3) The sink liquid 122 is provided to the sink liquid portion 144 through the sink liquid portion inlet 120 from the second liquid source 124.
4) The sink liquid 122 exits the chamber 102 under a positive pressure caused by the rotation of the chamber 102 through the sink liquid portion outlet 110, providing a reactive force that perpetuates the rotation of the chamber 102 about the axis of rotation 104.
5) Liquid is transferred via the vapour phase from the source liquid 116 in the source liquid portion 112 to the sink liquid 122 in the sink liquid portion 144 due to the difference between the vapour pressures of the source liquid 116 and the sink liquid 122.
6) The transfer of liquid via the vapour phase in step 5 replaces the sink liquid 122 lost through the sink liquid portion outlet 110.
7) Power is generated as a result of the rotation of the chamber 102 about the axis of rotation 104.

Steps 1 to 3 may be performed in any order. Steps 4 to 7 occur simultaneously and continuously once steps 1-3 have been completed. The rotation of the chamber 102 is thereby driven by the transfer of vapour from the source liquid 116 to the sink liquid 122 via the vapour phase.

Figure 4:
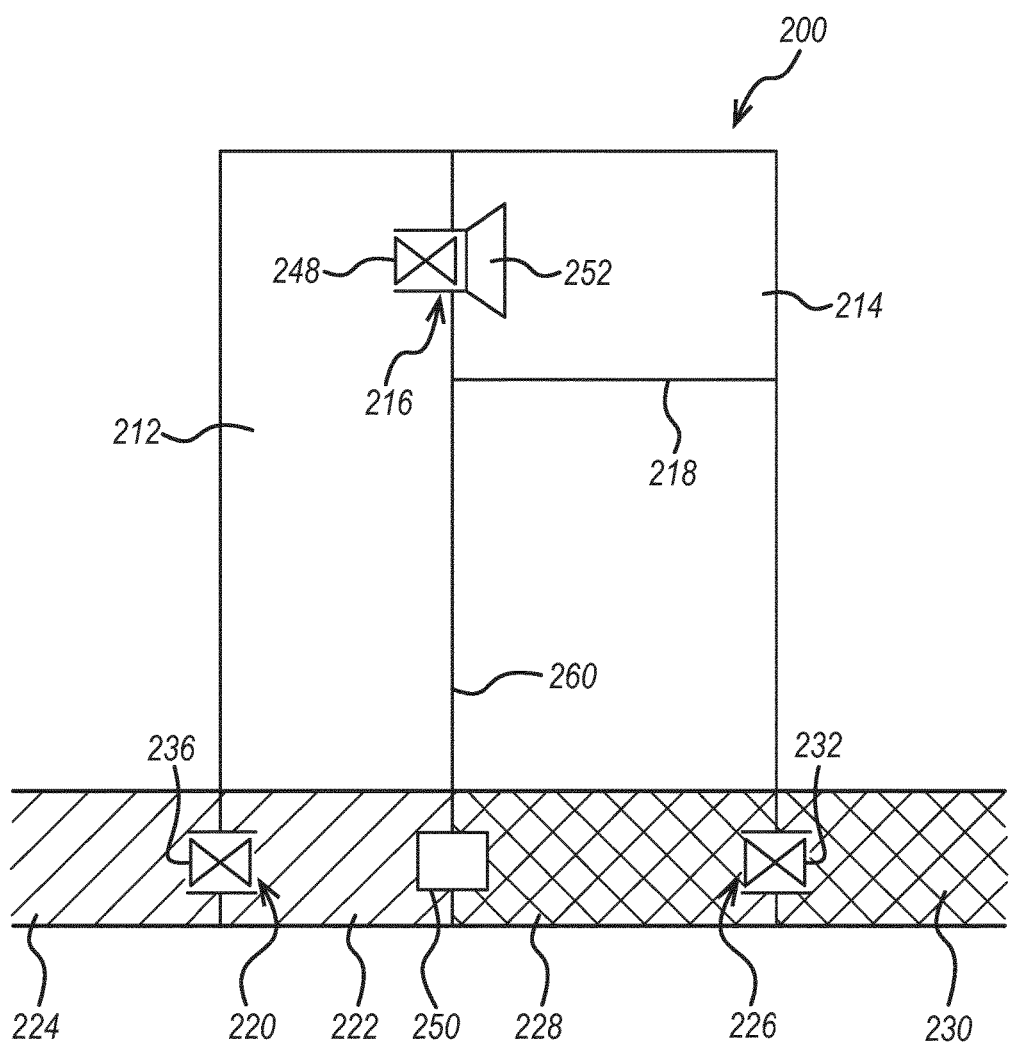
FIG. 4 shows a schematic cross-section side view of a third apparatus according to the present disclosure.

With reference to FIG. 4, there is illustrated a further apparatus according to the present disclosure. The apparatus may be used in a method of the present disclosure that may be described as the "heat pump" method. The heat pump method may be performed using an apparatus 200 comprising a source chamber 212 and a sink chamber 214. The source chamber 212 and the sink chamber 214 are connected by a vapour flow opening 216. The vapour flow opening 216 is located above the maximum level, $L_1$, reached by liquid within the apparatus (shown by line 218), such that liquid may not pass through the vapour flow opening 216.

The source chamber 212 incorporates an opening 220, through which a first liquid 222, also described as the source liquid, may pass to or from a first liquid source 224.

The sink chamber 214 incorporates an opening 226, through which a second liquid 228, also described as the sink liquid, may pass to or from a second liquid source 230.

First liquid 222 is separated from sink liquid 228, for example, by wall 260.

The apparatus 200 incorporates a heat pump 250 that is used to transfer heat from the sink chamber 214 to the source chamber 212.

The apparatus 200 further incorporates a mechanism for generating power 252, such as a turbine, interposed between the source chamber 212 and the sink chamber 214.

Power is generated as follows:
1) The source liquid 222 is introduced into the source chamber 212 from the first liquid source 224 through the source chamber opening 220, and the sink liquid 228 is introduced into the sink chamber 214 from the second liquid source 230 through the sink chamber opening 226.
2) Liquid is transferred via the vapour phase from the source liquid 222 in the source chamber 212 to the sink liquid 228 in the sink chamber 214 due to the difference between the vapour pressures of the source liquid 222 and the sink liquid 228.
3) Power is generated as a result of the flow of vapour through the turbine 252.

In addition to steps 1-3, the heat pump 250 is used to transfer heat energy from the sink liquid 228 to the source liquid 222. Evaporation from the source liquid 222 and condensation of the vapour in the sink chamber 214 causes a transfer of heat from the source liquid 222 to the sink liquid 228. This transfer of heat causes the difference between the vapour pressures of the source liquid 222 and the sink liquid 228 to reduce. Reduction in the vapour pressure gradient between the source chamber 212 and the sink chamber 214 has the effect of reducing the rate of vapour transfer, and will eventually halt vapour transfer completely. Use of the heat pump 250 counters this effect. Additionally, heat may be transferred from the sink liquid body to the source liquid body using a heat exchanger.

The heat pump 250 may be used to equalise the temperatures of the source liquid 222 and the sink liquid 228.

The difference between the vapour pressures of the source liquid 222 and the sink liquid 228 may be caused or increased by increasing the temperature of the source liquid 222, by lowering the temperature of the sink liquid 228, or, preferably, by a combination of the two. This may be achieved through the use of the heat pump 250, which transfers heat from the sink liquid 228 to the source liquid 222, such that $T_1 > T_2$, where $T_1$ is the temperature of the source liquid 222 and $T_2$ is the temperature of the sink liquid 228. Alternatively or additionally, the source liquid body may be heated by other means, for example using solar energy, electrical energy, or combustion.

The source chamber opening 220 may optionally incorporate a valve 236 which allows the source chamber opening 220 to be closed. Optionally, if present, the source chamber inlet valve 236 is closed after step 1 of the above listed sequence.

The sink chamber opening 226 may optionally incorporate a valve 232 which allows the sink chamber opening to be closed. Optionally, if present, the sink chamber opening valve 232 is closed after step 1 of the above listed sequence.

When the source chamber inlet valve 236 is not closed during step 2, it is preferable that the source chamber opening 220 is located entirely below the surface level of the first liquid source 224, such that gas may not pass into the apparatus 200 during operation.

Where the atmosphere is evacuated from within the apparatus 200 and the source chamber inlet valve 236 is not closed during operation, it is important that gas does not pass into the apparatus 200 through the source chamber opening 220 during operation. Likewise, where the atmosphere is evacuated from within the apparatus 200 and the sink chamber opening valve 232 is not closed during operation, it is important that gas does not pass into the apparatus 200 through the sink chamber opening valve 232 during operation.

When the sink chamber opening valve 232 is closed after step 1, the sink chamber 214 preferably has a large enough volume such that the transfer of vapour from the source liquid 222 to the sink liquid 228 does not reduce the difference between the vapour pressures of the source liquid 222 and the sink liquid 228 to a level where the rate of vapour transfer is substantially reduced. For example, in aspects wherein the sink liquid 228 is a saline solution and the source liquid 222 is a liquid or a solution having a lower salinity than that of the sink liquid 228, such as fresh water, the transfer of vapour from the source liquid 222 to the sink liquid 228 will progressively reduce the salinity of the sink liquid 228. Such a reduction in the salinity of the sink liquid 228 will reduce the difference between the vapour pressures between the source liquid 222 and the sink liquid 228 to a level where the rate of vapour transfer is reduced, or even halted.

When both the sink chamber opening valve 232 and the source chamber inlet valve 236 are closed after step 1, the sink chamber 214 preferably has a substantially greater volume than that of the source chamber 212.

Optionally, the vapour flow opening 216 may incorporate a valve 248 such that it may be closed.

Figure 6:
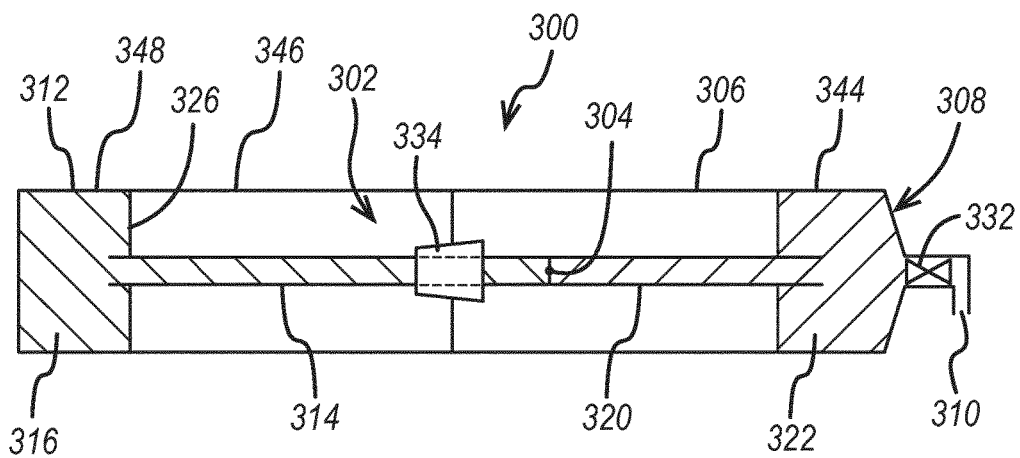
FIG. 6 shows a schematic view looking down onto the fourth apparatus of FIG. 5.
Figure 5:
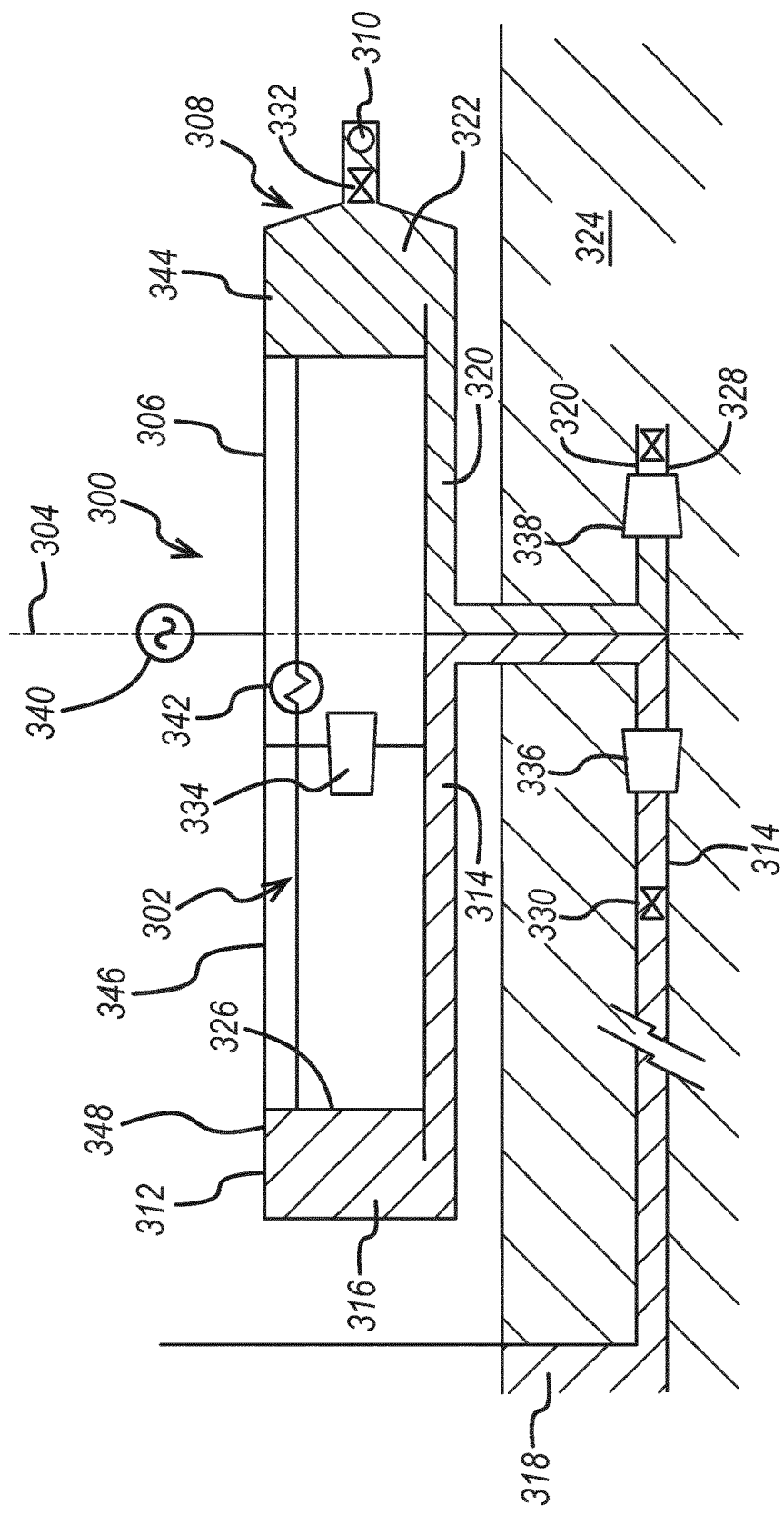
FIG. 5 shows a schematic cross-sectional side view of a fourth apparatus according to the present disclosure.

With reference to FIGS. 5 and 6, there is illustrated a fourth apparatus according to the present disclosure. The apparatus may be used in a method of the present disclosure that may be described as the "second rotational method". The second rotational method may be performed using an apparatus 300 comprising a chamber 302 that is configured such that it may rotate about an axis of rotation 304.

The chamber 302 comprises a first arm 306 extending outwards from the axis of rotation 304. The end of the first arm 306 furthest from the axis of rotation 304 is referred to as the distal end 308.

The first arm 306 incorporates a sink liquid portion 344 located towards the distal end 308 of the first arm 306.

The sink liquid portion 344 incorporates an outlet 310.

The sink liquid portion outlet 310 is located and directed such that the release of liquid through the sink liquid portion outlet 310 provides a force that causes the rotational motion of the chamber 302 about the axis of rotation 304.

The chamber 302 further comprises a second arm 346 extending outwards from the axis of rotation 304. The end of the second arm 346 furthest from the axis of rotation 304 is referred to as the distal end 348.

The second arm 346 incorporates a source liquid portion 312 located towards the distal end 348 of the second arm 346.

The source liquid portion 312 incorporates an inlet 314, hereafter referred to as the source liquid portion inlet 314, through which a first liquid 316, also referred to as the source liquid, may pass to or from a first liquid source 318.

The sink liquid portion 344 incorporates an inlet 320, hereafter referred to as the sink liquid portion inlet 320, through which a second liquid 322, also referred to as the sink liquid, may pass to or from a second liquid source 324.

Power is generated as follows:
1) The source liquid 316 is introduced into the source liquid portion 312 through the source liquid portion inlet 314 from the first liquid source 318. The source liquid 316 is confined within the source liquid portion 312 and a surface 326 of the source liquid 326 is exposed to the interior of the chamber 302, such that the source liquid 316 may evaporate into the interior atmosphere of the chamber 302.
2) The chamber 302 is rotated about the axis of rotation 304.
3) The sink liquid 322 is provided to the sink liquid portion 344 through the sink liquid portion inlet 320 from the second liquid source 324.
4) The sink liquid 322 exits the chamber 302 under a positive pressure caused by the rotation of the chamber 302 through the sink liquid portion outlet 310, providing a reactive force that perpetuates the rotation of the chamber 302 about the axis of rotation 304.
5) Liquid is transferred via the vapour phase from the source liquid 316 in the source liquid portion 312 to the sink liquid 322 in the sink liquid portion 344 due to the difference between the vapour pressures of the source liquid 316 and the sink liquid 322.
6) The transfer of liquid via the vapour phase in step 5 replaces the sink liquid 322 lost through the sink liquid portion outlet 310.
7) Power is generated as a result of the rotation of the chamber 302 about the axis of rotation 304.

Steps 1 to 3 may be performed in any order. Steps 4 to 7 occur simultaneously and continuously once steps 1-3 have been completed. The rotation of the chamber 302 is thereby driven by the transfer of vapour from the source liquid 316 to the sink liquid 322 via the vapour phase.

The following features apply to the second and fourth apparatus of the present disclosure.

Preferably, the chamber 102/302 may be coupled to an electrical alternator or generator 140/340 such that the rotational motion of the chamber may be used to generate electrical energy.

The sink liquid portion inlet 120/320 may incorporate a valve 128/328, such that the flow of liquid through the sink liquid portion inlet 120/320 may be controlled or stopped.

The sink liquid portion inlet 120/320 may incorporate a turbine 138/338. Flow of liquid through the turbine may be used to generate power. Alternative mechanisms for generating power are also contemplated, for example those employing pistons, screws or paddles.

The sink liquid portion inlet 120/320 may incorporate a pump (not shown), such that liquid may be actively pumped into the sink liquid portion 144/344 from the second liquid source 124/324.

The source liquid portion inlet 114/314 may incorporate a valve 130/330, such that the flow of liquid through the source liquid portion inlet 114/314 may be controlled or stopped.

The source liquid portion inlet 114/314 may incorporate a turbine 136/336. Flow of liquid through the turbine 136/336 may be used to generate power. Alternative mechanisms for generating power are also contemplated, for example those employing pistons, screws or paddles.

The source liquid portion inlet 114/314 may incorporate a pump (not shown), such that liquid may be actively pumped into the source liquid portion 112/312 from the first liquid source 118/318.

Preferably, the volume of sink liquid 122/322 lost from the apparatus 100/300 through the sink liquid portion outlet 110/310 is further replaced by a quantity of sink liquid 122/322, provided from the second liquid source 124/324 via the sink liquid portion inlet 120/320. The addition of further sink liquid 122/322 during steps 4 to 7 reduces and stabilises the amount by which the sink liquid 122/322 is diluted as a result of the transfer of liquid via the vapour phase from the source liquid 116/316 to the sink liquid 122/322. Otherwise, dilution of the sink liquid 122/322 by the source liquid 116/316 reduces the difference between the vapour pressures of the source liquid 116/316 and the sink liquid 122/322, which would slow the rate of vapour transfer. For example, where the sink liquid 122/322 is a saline solution and the source liquid 1161316 is a liquid or a solution having a lower salinity than that of the sink liquid, such as fresh water, the transfer of vapour from the source liquid to the sink liquid 122/322 progressively reduces the salinity of the sink liquid 122/322.

The sink liquid portion outlet 110/310 may optionally incorporate a valve 132/332 that may be closed or that may regulate the flow of liquid through the sink liquid portion outlet 110/310.

The sink liquid portion outlet valve 132/332 may be closed during steps 1-3 and opened only after step 3 is complete. This has an advantage that the sink liquid 122/322 is not lost from the apparatus 100/300 through the sink liquid portion outlet 110/310 as it is introduced into the apparatus 100/300 in step 3. The sink liquid portion outlet 110/310 may incorporate a nozzle (not shown), such that the flow of liquid through the sink liquid portion outlet 110/310 may be directed as required.

As the chamber 102/302 rotates about the axis of rotation 104/304, its motion will be impeded by air resistance. It is therefore advantageous for the chamber 102/302 to be shaped aerodynamically so as to minimise air resistance and thereby improve the efficiency of power generation.

The apparatus may incorporate a turbine 134/334 interposed between the source liquid portion 112/312 and the sink liquid portion 144/344. Flow of vapour through the turbine 134/334 may be used to generate power.

Differences between the vapour pressures of the source liquid 116/316 and the sink liquid 122/322 may be caused or increased by increasing the temperature of the source liquid 116/316, by lowering the temperature of the sink liquid 122/322, or, preferably, by a combination of the two. This may be achieved through the use of a heat pump 142/342, which transfers heat from the sink liquid 122/322 to the source liquid 116/316, such that $T_1 > T_2$, where $T_1$ is the temperature of the source liquid 116/316 and $T_2$ is the temperature of the sink liquid 122/322. The use of a heat pump is advantageous in this situation as the difference between $T_1$ and $T_2$ is not large and the transfer of heat will therefore be efficient. Alternatively or additionally, the source liquid body may be heated by other means, for example using solar energy, electrical energy, or combustion.

Mathematical Models

Some mathematical considerations relating to the fifth aspect of the present disclosure are presented below.

In a rotating apparatus, such as that illustrated in FIGS. 2 and 3, the general differential equation for centrifugal force is $$\rho r \omega^2 dr = dP, \quad (1)$$

where $\rho$ is the density, r is the radius from the axis of rotation, $\omega$ is the angular frequency and P is the pressure.

For the sink liquid $\rho$ is constant, whereas for the vapour phase $\rho$ varies. For the vapour phase, $\rho$ is given by $$\rho = \frac{n\mu}{V}, \quad (2)$$

where n is the number of moles of gas, $\mu$ is the molar mass of the molecules in the vapour phase, and V is the volume. Substituting Equation 2 into Equation 1 gives $$\frac{n\mu}{V} r \omega^2 dr = dP. \quad (3)$$

For an ideal gas, V is given by the ideal gas equation:

$$PV = nRT, \quad (4)$$

where n is the number of moles of gas, R is the ideal gas constant, and T is the temperature in K. Substituting Equation 4 into Equation 3 gives $$\frac{n\mu P}{nRT} r \omega^2 dr = dP. \quad (5)$$

Integrating both sides of Equation 5 gives $$\frac{\mu}{RT} \omega^2 \int_0^A r\, dr = \int_{P_0}^{P_A} \frac{dP}{P}, \quad (6)$$

$$P_A = P_0 \exp\left[\frac{\mu \omega^2}{RT}\left(\frac{A^2}{2}\right)\right]. \quad (7)$$

where, referring to FIG. 2, $P_A$ is the vapour pressure at radius A (the surface of the sink liquid 122), and $P_0$ is the vapour pressure at the axis of rotation 104.

For the rotating sink liquid Equation 1 may be integrated directly as p is constant for a liquid. This gives $$\rho \omega^2 \int_A^B r\, dr = \int_{P_A}^{P_B} dP, \quad (8)$$

$$\rho \omega^2 \left(\frac{B^2}{2} - \frac{A^2}{2}\right) = P_B - P_A, \quad (9)$$

where, referring to FIG. 2, $P_A$ is the vapour pressure at radius A (the surface of the sink liquid 122), $P_B$ is the sink liquid pressure at radius B (the radius at which the sink liquid portion outlet 110 is located) and $\rho$ is the density of the sink liquid 122.

By substituting Equation 7 into Equation 9 and rearranging, the pressure ($P_B$) of the sink liquid 122 released from the sink liquid portion outlet 110 may be calculated according to Equation 10:

$$P_B = P_0 \exp\left[\frac{\mu \omega^2}{RT}\left(\frac{A^2}{2}\right)\right] + \rho \omega^2 \left(\frac{B^2}{2} - \frac{A^2}{2}\right). \quad (10)$$

Example 1—the First Rotational Method

An apparatus comprising a chamber comprising a sink liquid portion is configured such that the sink liquid portion may rotate in the horizontal plane about an axis of rotation. The chamber comprises an arm, which extends 5 m from the axis of rotation in the horizontal plane. The sink liquid portion is located at the end of the arm that is furthest from the axis of rotation. The arm is square in cross section, when viewed along its longitudinal axis, with a corresponding cross-sectional area of 4 m². The sink liquid portion comprises an outlet, in the form of a nozzle. The sink liquid portion outlet is situated at the extreme distal end of the arm and is oriented such that liquid exits the sink liquid portion of the chamber through the sink liquid portion outlet in the horizontal plane. The sink liquid portion outlet also incorporates a valve that may be closed or that may regulate the flow of liquid through the sink liquid portion outlet. The sink liquid portion is connected to a saline water source with an approximate salinity of 35 g/l by an inlet. The sink liquid portion inlet incorporates a valve that may be closed or that may regulate the flow of liquid through the sink liquid portion inlet. The sink liquid portion inlet also incorporates a pump so that liquid may be pumped into the sink liquid portion. The chamber further comprises a source liquid portion. The source liquid portion comprises a cylindrical source reservoir of diameter 2 m. The source reservoir is connected to a fresh water source through an inlet.

With the exception of the sink liquid portion outlet, the sink liquid portion inlet, and the source liquid portion, or source reservoir, inlet, the apparatus is airtight.

The apparatus comprises a spindle that is aligned along the axis of rotation and is connected securely at its bottommost portion to the top surface of the chamber. The spindle passes into a generator, which is used to convert the rotational motion of the sink chamber into electricity.

The apparatus is operated as follows:
1) Fresh water is allowed to enter the source liquid portion, or source reservoir, through the source liquid portion inlet.
2) The sink liquid portion outlet valve is closed.
3) The arm comprising the sink liquid portion at its distal end is rotated to 60 RPM by running the generator in reverse and is kept rotating at this frequency.
4) 10 m$^3$ of saline water is pumped into the sink liquid portion through the sink liquid portion inlet and is confined to the distal end of the arm by the rotational motion of the arm.
5) The sink liquid portion outlet valve is opened to allow a flow of 10 m$^3$/min to flow through it.
6) As liquid passes through the sink liquid portion outlet, the quantity of liquid confined to the distal end of the arm is kept constant at 10 m$^3$ through the transfer of fresh water from the source reservoir via the vapour phase and by the transfer of saline water through the sink liquid portion inlet.
7) An equilibrium is reached wherein the salinity of the liquid confined to the distal end of the arm is constant at 20 g/l.

The rotational motion of the sink liquid portion is maintained by the flow of liquid through the sink liquid portion outlet and the generator is used to generate electricity from the rotational motion of the sink liquid portion.

The invention claimed is:

1. An apparatus for generating power comprising
a chamber, wherein:
the chamber comprises a source liquid portion and a sink liquid portion;
the sink liquid portion is rotatable about an axis of rotation;
the axis of rotation is not coincident with any part of the sink liquid portion;
the sink liquid portion comprises an outlet;
the sink liquid portion outlet is positioned such that a release of liquid through the sink liquid portion outlet causes the sink liquid portion to rotate about the axis of rotation;
the source liquid portion comprises an inlet for connecting to a first liquid source;
the sink liquid portion comprises an inlet for connecting to a second liquid source;
in use, the first liquid source has a lower salinity than the second liquid source, and liquid is transferred via vapour phase from source liquid in the source liquid portion to sink liquid in the sink liquid portion due to a difference between vapour pressures of the source liquid and the sink liquid; and
the apparatus comprises a first mechanism for generating power from the rotation of the sink liquid portion about the axis of rotation.

2. The apparatus of claim 1 wherein the source liquid portion is rotatable about the axis of rotation.

3. The apparatus of claim 1 wherein the chamber is rotatable about the axis of rotation.

4. The apparatus of claim 3 wherein the source liquid portion and the sink liquid portion are configured to contain liquid when the chamber is rotating about the axis of rotation.

5. The apparatus of claim 3 wherein the sink liquid portion is configured to contain liquid when the chamber is not rotating about the axis of rotation.

6. The apparatus of claim 3 wherein the source liquid portion is configured to contain liquid when the chamber is not rotating about the axis of rotation.

7. The apparatus of claim 1 wherein the chamber comprises a first arm, wherein the first arm comprises a distal end, wherein the distal end is the end of the first arm that is furthest from the axis of rotation, and wherein the sink liquid portion is located at the distal end of the first arm.

8. The apparatus of claim 1 wherein the axis of rotation is not coincident with any part of the source liquid portion.

9. The apparatus of claim 8 wherein the chamber comprises a second arm, wherein the second arm comprises a distal end, wherein the distal end is the end of the second arm that is furthest from the axis of rotation, and wherein the source liquid portion is located at the distal end of the second arm.

10. The apparatus of claim 8 wherein the closest distance between the source liquid portion and the axis of rotation is greater than the closest distance between the sink liquid portion and the axis of rotation.

11. The apparatus of claim 1 wherein the axis of rotation is coincident with at least part of the source liquid portion.

12. The apparatus of claim 1 further comprising a second mechanism for generating power from a flow of vapour between the source liquid portion and the sink liquid portion.

13. The apparatus of claim 1 comprising a heat pump configured to transfer heat from the sink liquid portion to the source liquid portion.

* * * * *